United States Patent [19]

Kurokawa

[11] Patent Number: 4,650,626
[45] Date of Patent: Mar. 17, 1987

[54] METHOD OF PRODUCING A GOLF CLUB HEAD

[75] Inventor: Ikuji Kurokawa, Hamamatsu, Japan

[73] Assignee: Nippon Gakki Seizo Kabushiki Kaisha, Japan

[21] Appl. No.: 663,078

[22] Filed: Oct. 19, 1984

[30] Foreign Application Priority Data

Jul. 13, 1984 [JP] Japan ................................ 59-146526
Jul. 13, 1984 [JP] Japan ................................ 59-146527
Jul. 13, 1984 [JP] Japan ................................ 59-150924

[51] Int. Cl.⁴ ............................................ B29C 45/02
[52] U.S. Cl. ................................ 264/278; 264/261; 264/276; 264/277; 264/297.2; 264/328.2; 264/328.5; 264/328.9; 264/DIG. 44; 273/167 R
[58] Field of Search .................... 264/261, 271.1, 275, 264/276, 277, 278, 279, 279.1, 259, DIG. 64, DIG. 44, 328.9, 328.1, 328.11, 328.12, 328.15, 328.2, 328.4, 328.5, 297.2; 273/167 R, 169, 167 H, 173, 167 F; 425/DIG. 224

[56] References Cited

U.S. PATENT DOCUMENTS

| 1,515,390 | 11/1924 | Hubbard | 273/169 |
| 2,460,435 | 2/1949 | Schaffer | 273/169 |
| 3,522,340 | 7/1970 | Corcoran et al. | 264/244 |
| 4,427,615 | 1/1984 | Eskesen | 264/278 |
| 4,464,324 | 8/1984 | Hager | 264/221 |

FOREIGN PATENT DOCUMENTS 2115295  9/1983  United Kingdom .......... 273/167 H

Primary Examiner—Jan Silbaugh
Assistant Examiner—Mary Lynn Fertig
Attorney, Agent, or Firm—Lerner, David, Littenberg, Krumholz & Mentlik

[57] ABSTRACT

In production of a golf club head by heat pressing of a compound in a splittable mould, the compound of a fixed weight is injected into the mould cavity through an injection tube which is clamped by the mould and removed after appreciable hardening of the compound. Provision of an asylum for extra bulk of compound by the injection tube remarkably reduces production of undesirable dregs or flash at heat pressing. The injection tube also serves to define the correct positioning of a core used in the product.

14 Claims, 15 Drawing Figures

METHOD OF PRODUCING A GOLF CLUB HEAD

BACKGROUND OF THE INVENTION

The present invention relates to improved method for producing a golf club head, and more particularly relates to improvement in production of a golf club head by heat pressing a compound in a mould.

Among various conventional methods for production of a golf club head, there are two types of molding processes, which are considered as typical ones. One is the injection molding by which viscous material is injected under high pressure into the mold cavity, and remains in the mold under high pressure until it cools, and is then ejected. This molding method, however, has a drawback in that golf club heads of larger bulk render them heavier than desired. To solve this problem, it has been proposed to use a pair of core halves bonded together to form a cavity therein. Such core halves, however, must be strong enough to endure high pressure at molding, and must attain a correct positioning in the mold. For this, it requires more labor and higher cost.

Further, the conventional injection molding has another drawback in that it is difficult to obtain golf club heads of uniform weight. Among the golf club heads so produced, the weights differ one from the other. The reason is that: the viscous material injected into the mold can be set in a predetermined volume; however, the specific gravity of the material differ each time it is injected, and the resultant weights of the products differ.

The other of the conventional molding processes for production of a golf club head is as follows. A crude core is first prepared by proper preparatory shaping and a crude shell in the form of fiber reinforced plastic is attached to the outer face of the crude core by, for example, manual coating. Thereafter the combined crude body is placed in a mould for heat pressing.

In this case, the amount of the fiber reinforced plastic to be supplied into the mould cavity for production of each golf club head is controlled by weight measurement before individual supply. However, supply of constant weight does not always assure supply of constant bulk of the fiber reinforced plastic because of unavoidable fluctuation in specific gravity of the material containing reinforcing fibers. Thus, the bulk of the fiber reinforced plastic supplied into the mould cavity tends to deviate from the standard which is fixed by the capacity of the mould cavity.

When the resultant bulk is smaller than the standard, i.e. the specific gravity is larger than the standard, the heat pressing is liable to develop lots of surface and inner voids on and in the product which seriously lower the commercial value and mechanical strength of the product. In order to obviate this trouble, it is usual to supply an excessive amount of fiber reinforced plastic into the mould cavity so that the resultant bulk should meet the capacity of the mould cavity even when the specific gravity of the material is larger than the standard. Such excessive supply of fiber reinforced plastic may well avoid the void trouble but it causes another trouble in production. When the specific gravity of the material is on the standard or less, the excessive supply in weight naturally results in a bulk of the supplied fiber reinforced plastic larger than the capacity of the mould cavity which is fixed. As a consequence, the extra bulk of the supplied fiber reinforced plastic seeks asylum in the mould at heat pressing and is forced to permeate into interstices between mating faces of mould halves. This behaviour of the fiber reinforced plastic at heat pressing develops significantly projecting dregs or flash on the surface of the product after heat pressing. These dregs have to be removed for commercial reasons. Removal of such dregs requires additional work, mars the surface quality of the product, and connects to waste of the material. In addition, reinforcing fibers in the shell are more or less broked during the removal, thereby lowering the strength of the golf club head.

In addition to the foregoing, this process has difficulty in correct positioning of the crude core since the crude core must keep a position in the mould cavity to leave the predetermined gap during filling of the crude shell material. Several spacers may be arranged around the crude core in the mould cavity. In this case, however, ends of the spacers appear on the surface of the product and mar the surface quality of the product. Alternatively, one or more supporting arms may be inserted into the mould cavity. In this case, however, inlet of the crude shell material formed in the wall of the mould cavity is directed towards the surface of the crude core in the mould cavity. As a consequence, pressure at filling of the crude shell material directly acts on the crude core supported by the supporting arms and the crude core is liable to loose its initial set position during filling of the crude shell material. Such unexpected displacement of the crude core often poses ill influence on the strength of the shell in the product and further causes incorrect shaping of the product.

SUMMARY OF THE INVENTION

It is the basic object of the present invention to enable production of a golf club head minimizing any development of surface voids and undesirable dregs or flash despite possible specific gravity fluctuation of a compound injected into the mould.

It is another object of the present invention to produce a golf club head of larger bulk and of smaller weight.

It is a further object of the present invention to obtain a golf club head having a desired weight.

It is a still further object of the present invention to provide firm positioning of a crude core in a mould cavity during injection of a compound.

In accordance with the basic aspect of the present invention, an elongated injection tube is held firm by a fastened splittable mould with its supply mouth opening deeply in the mould cavity, a compound is injected into the cavity mould through the injection tube, and the tube is removed after appreciable hardening of the compound by heat pressing.

In a preferred embodiment of the present invention, an elongated injection tube is partly inserted through a crude core with its supply mouth opening in the surface of the crude core, the crude core is placed in position in a cavity of a splittable mould leaving a prescribed gap therearound whilst holding the injection tube by fastening of the mould, a compound is injected into the gap via the injection tube and the tube is removed after appreciable hardening of the compound by heat pressing.

DESCRIPTION OF THE PREFERRED EMBODIMENTS.

Figure 1:
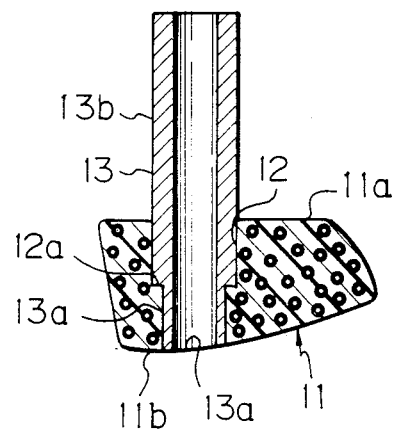
FIGS. 1 through 3 are side sectional views for showing sequencial operational steps in one embodiment of the method in accordance with the present invention.
Figure 2:
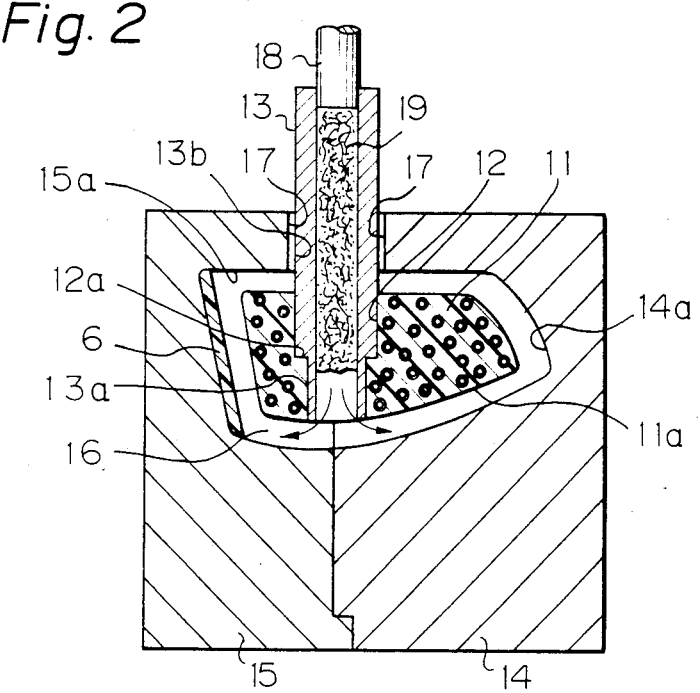
Figure 3:
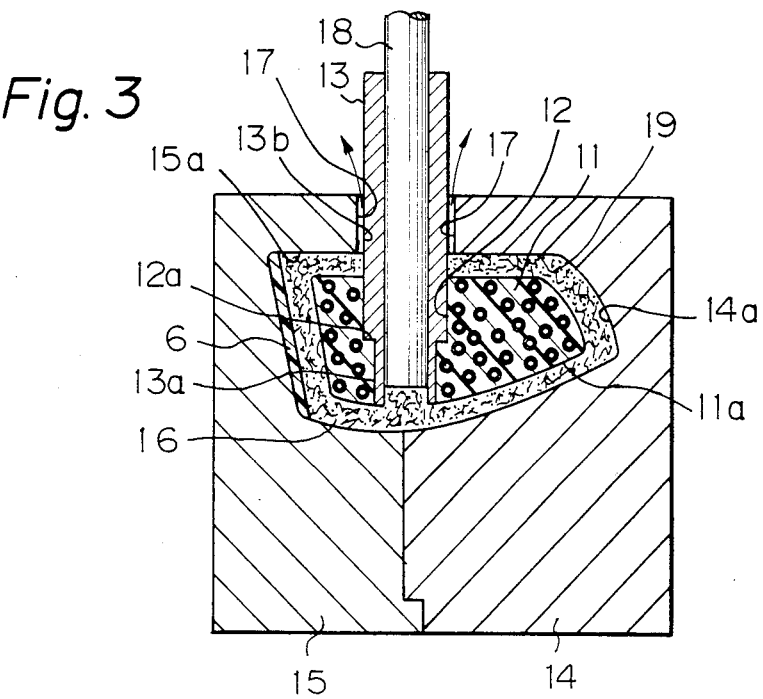

One embodiment of the method in accordance with the present invention is shown in FIGS. 1 through 3.

A crude core 11 is first prepared by preparatory shaping so that it should have a configuration almost close to a core in a produced golf club head. This crude core 11 has a through hole 12 extending from its sole side surface 11b to its top side surface 11a. In the case of the illustrated example, the through hole 12 has an intermediate step 12a for stable combination with the injection tube. An elongated injection tube 13 is inserted into the through hole 12 in the crude core 11 with its supply mouth 13a opening in the top side surface 11a of the crude core 11 and its body 13b projecting significantly from the sole side surface 11b of the crude core 11. On the outer face the injection tube 13 has an intermediate step which engages with the intermediate step 12a of the through hole 12 when inserted. The injection tube 13 is preferably made of proper metal and separably and provisionally secured to the wall of the through hole 12 so that it can be easily removed after heat pressing.

Next, such a crude core 11 is placed in position in the cavity of a splittable mould made up of a pair of mould halves 14 and 15 whilst leaving a prescribed gap 16 therearound. At this placing of the crude core 11, the injection tube 13 is clamped firm between the mould halves 14 and 15 at its body 13b whilst leaving air vents 17 opening in the gap 16. Even when such air vents 17 are not left on purpose, unavoidable tolerance gap between the tube 13 and the mould halves 14 and 15 automatically creates such air vents at clamping. The gap 16 formed between the outer surface of the crude core 11 and the inner walls 14a and 15a of the mould halves 14 and 15 is identical in configuration to a later described shell in the produced golf club head. The crude core 11 is held firm in position in the mould cavity by the mould via the injection tube as shown in FIG. 2 and additional elements such as a face plate 6 are also placed in position in the mould cavity.

After complete placing of these elements, the injection tube 13 is used as a cylinder for introducing a compound into the mould cavity. More specifically, a compound 19 hereinafter defined is injected into the gap 16 in the mould cavity via the tube 13 by operation of a piston rod 18. Air in the gap 16 breaks out of the mould via the air vent 17 at the clamp.

Throughout the specification and claims, the term "compound" means any one of the combinations: synthetic resin(s) and filler(s); synthetic resin(s) and reinforcing fiber(s); and synthetic resin(s), filler(s) and reinforcing fiber(s). Thermosetting resins such as vinyl ester resin, polyester resin and epoxy resin, are used as the synthetic resins. Aluminum hydroxide, microballoons, carbon powder, ceramic powder and other known materials may be used as the fillers. The reinforcing fibers may, for example, be glass fibers, carbon fibers, aramid fibers, whiskers (alumina, silicone carbide, boron carbide, etc,) or any combination thereof.

Heat pressing follows for hardening of the synthetic resins forming the crude core and shell (compound) 11 and 19 as shown in FIG. 3. The injection tube 13 is removed after appreciable hardening. An opening in the shell to be formed by this may be closed by proper filler or the like.

Figure 4:
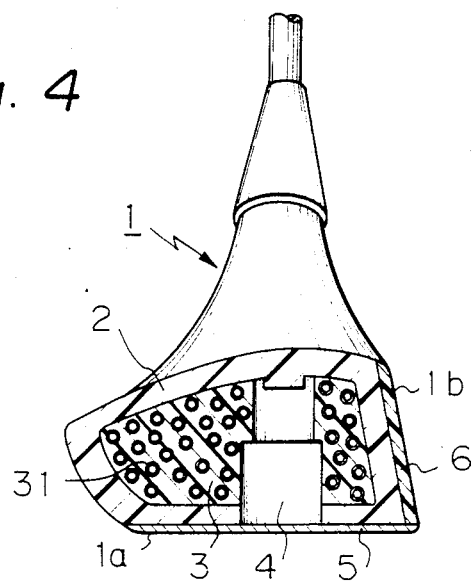
FIG. 4 is a side sectional view of one example of the golf club head produced by the method in accordance with the present invention.

FIG. 4 shows one example of the golf club head produced in accordance with the above-described method of the present invention. More specifically, a golf club head 1 is made up of a core 3 and a shell 2 almost wholly embracing the core 3. In the case of this example, the core 3 is made of syntactic foam, i.e. synthetic resin containing a number of fine, cavitious glass beads 31. Other suitable cores such as cavitious FRP cores may be used as a substitute for the syntactic foam core. The shell 2 in this example is made of fiber reinforced plastics. The golf club head 1 has a cylindrical cavity 4 which extends wholly through the core 3 and the sole side section of the shell 2. The sole side end of the cylindrical cavity 4 is closed by a sole plate 5 attached to the sole side 1a of the golf club head 1 whereas the top side end of the cylindrical cavity 4 is closed by the top side section of the shell 2. The golf club head 1 is further provided with a face plate 6 attached to its face side 1b.

As described above, the extra bulk of the compound 19 seeks asylum in the mould at heat pressing in particular when the specific gravity of the fiber reinforced plastic material is on the standard or smaller. As best seen in FIG. 3, the axial hole of the injection tube 13 admits such extra bulk of the compound 19. In other words, the injection tube 13 provides a sort of asylum for the extra compound, thereby remarkably reducing production of dregs or flash at heat pressing. In addition to this advantage, it will be seen that the supply mouth 13a of the injection tube 13 is constantly directed towards the inner walls 14a and 15a of the mould halves 14 and 15. Consequently, pressure generated at injection of the compound 19 acts in the axial direction of the tube 13 only and has no effect to drive the crude core 11 sideways off the position. The pressure acting in the axial direction of the tube 13 is borne by the mould via the tube 13. As injection advances, the compound 19 filling in the gap 16 may pose pressure on the crude core 11 in various directions but such pressure offsets with each other having no effect to move the crude core 11 off the position. In other words, there is a balance of pressure which keeps the crude core 11 in position.

In preparation of fiber reinforced plastics used for the shell, carbon fibers chopped to the length of 12.5 to 50 mm, for example 12.5 or 25 mm, are mixed with epoxy resin solution at a mixing ratio of 30:70 to 70:30 (resin:fibers), for example 50:50. Mixing ratio of the fine beads to epoxy resin for the core is, for example, 30:70.

In one example of compound injection, an injection tube of 30 mm diameter at the supply mouth is used for a gap of 5 mm thickness with 200 kg/cm$^2$ injection pressure. Heat pressing is carried out, for example, at 130° C. for 7 min. The injection tube is removed after complete solidification of the compound. It may also be removed when the compound has been solidified enough to maintain its shape.

In the construction shown in FIG. 1, the step engagement provides stable combination of the crude core 11 with the injection tube 13. As a substitute for such a discontinuous change in diameter, diameters of the injection tube may be changed continuously along its length with a corresponding continuous change in diameter of the through hole 12 in the crude core 11. Further alternatively, one or more wedges may be force inserted between the injection tube 13 and the through hole 12 on the sole side of the crude core 11. These constructions all effectively endure the axial pressure generated at injection of the compound 19 into the gap 16, thereby blocking the crude core 11 against displacement in the axial direction of the injection tube 13.

Figure 5:
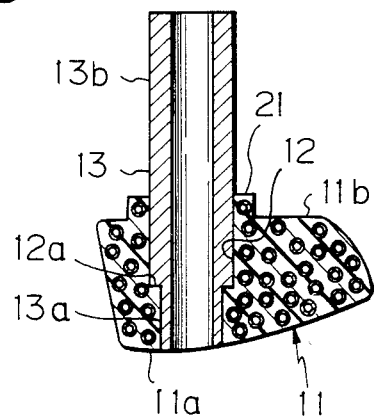
FIG. 5 and 6 are side sectional views for showing sequential operational steps in another embodiment of the method in accordance with the present invention.
Figure 6:
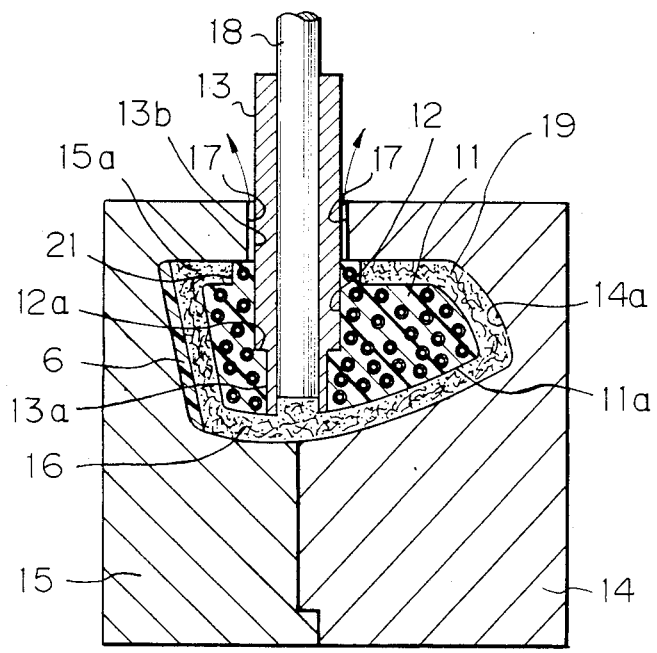

A stronger resistance against the above-described axial pressure is provided by the construction shown in FIG. 5, in which the crude core 11 has a tubular projection 21 surrounding the body 13b of the injection tube 13 on the top side surface. The height, i.e. the axial length, of the tubular projection 21 is equal to the thickness of the gap 16 to be left in the mould cavity. With this construction, the top end of the tubular projection 21 abuts the inner wall 14a and 15a of the mould halves 14 and 15 when the crude core 11 is placed in position in the mould cavity as shown in FIG. 6. When axial pressure acts on the crude core 11 at injection of the compound 19, the abutment blocks the crude core against axial displacement.

Figure 7:
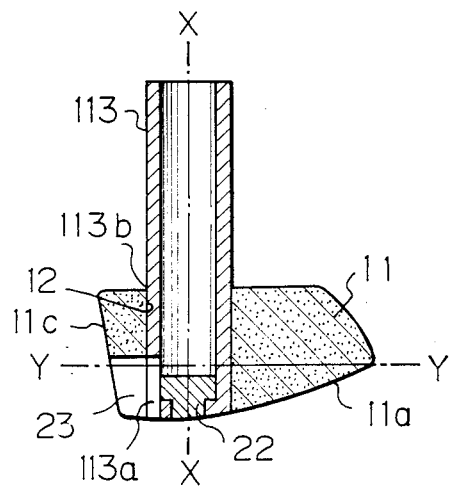
FIGS. 7 and 8 are side sectional and perspective views of another embodiment of the injection tube/crude core combination in accordance with the present invention.
Figure 8:
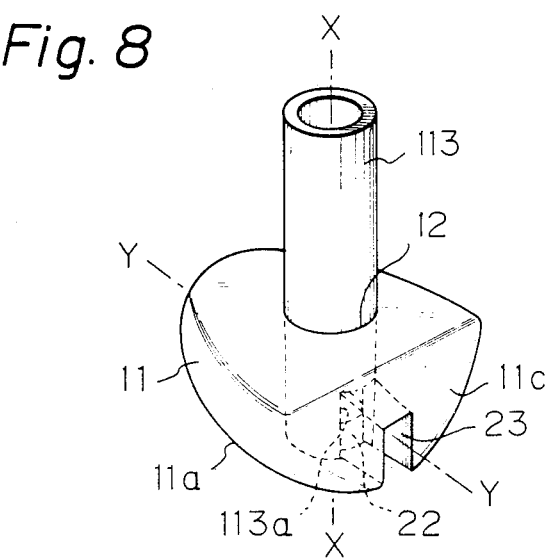

In the case of the injection shown in FIGS. 3 and 6, the compound 19 flowing out of the supply mouth 13a of the injection tube 13 may more or less move attachments such as a face plate 6 once set in position on the face side wall of the mould cavity. The construction shown in FIGS. 7 and 8 well avoids this trouble. Like the injection tube 13 shown in FIG. 1, an injection tube 113 used for this embodiment has a supply mouth 113a and a body 113b exposed outside the crude core 11. The top side end of the injection tube 113 is closed by a proper plug 22 and the supply mouth 113a is given in the form of a cutout formed through the wall of the tube 113 near the plug 22. The direction Y—Y of the supply mouth 113a is almost normal to the axial direction X—X of the tube 113. In connection with this supply mouth 113a of the tube 113, a cutout 23 is formed in the crude core 11 whilst opening in the face side surface 11c of the crude core 11.

Figure 9:
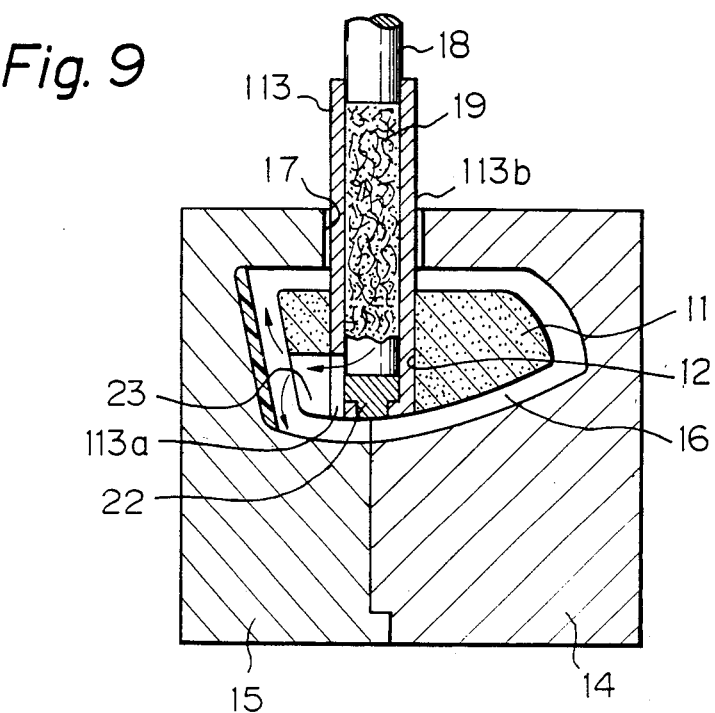
FIG. 9 is a side sectional view for showing injection of a compound using the injection tube/crude core combination shown in FIGS. 7 and 8.
Figure 10:
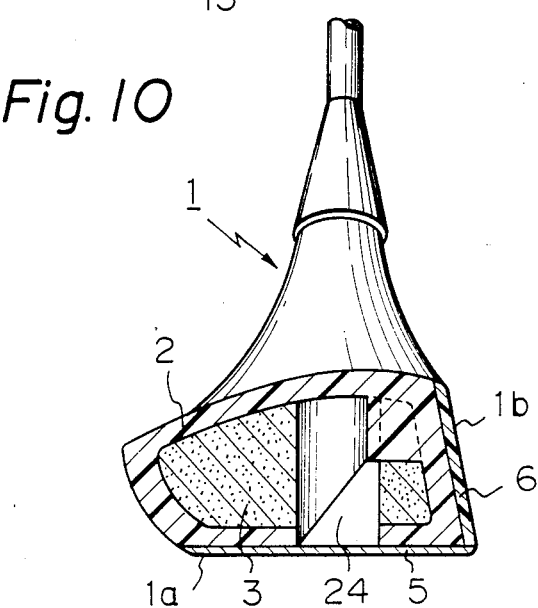
FIG. 10 is a side sectional view of one example of the golf club head produced by the method in accordance with the present invention.

Like the foregoing embodiments, the crude core 11 is held firm in position in the mould cavity by the mould halves 14 and 15 via the injection tube 113 as shown in FIG. 9. At injection of the compound 19, the compound 19 flows from the interior of the injection tube 113 into the cutout 23 in the crude core 11 via the supply mouth 113a. Since the cutout 23 opens in the face side surface 11c of the crude core 11, the compound 19 introduced into the cutout 23 flows towards the attachments on the face side wall of the mould cavity and presses the attachments firm on the wall, thereby avoiding undesirable movement of the attachments at injection of the compound. One example of the golf club head so produced is shown in FIG. 10, in which a golf club head 1 has a deformed cylindrical cavity 24 formed by removal of the injection tube 113.

Figure 11:
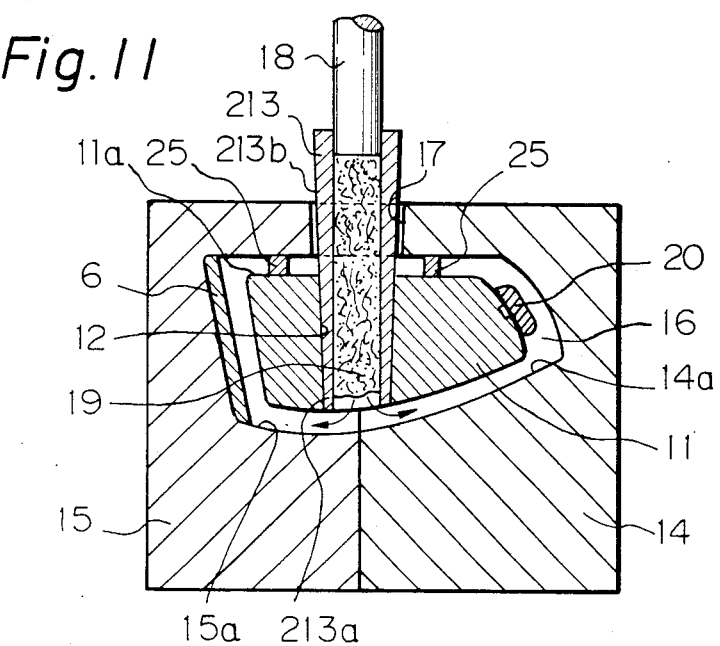
FIG. 11 is a side sectional view for showing injection of a compound in the other embodiment of the method in accordance with the present invention.

A construction shown in FIG. 11 provides a further expedient to block the crude core against displacement which is otherwise caused by injection pressure. An injection tube 213 used for this embodiment has continuous change in outer diameter for easier removal after heat pressing. Like the embodiment shown in FIG. 1, the injection tube 213 has a supply mouth 213a opening in the top side surface 11b of the crude core 11 and a body 213b exposed from the crude core 11.

As in the foregoing embodiments, the crude core 11 is held firm in position in the mould cavity by clamp of the mould on the injection tube 213 leaving an air vent 17. In the case of this embodiment, however, spacers 25 are interposed between the sole side surface 11a of the crude core 11 and the corresponding inner walls 14a and 15a of the mould halves 14 and 15. Preferably the spacers 25 are provisionally fixed at their positions by use of suitable bonding agents so that they should not be moved at introduction of a compound 19 into the gap 16 around the crude core 11. During injection of the compound 19, the spacers 25 keep the distance between the sole side surface of the crude core 11 and the corresponding inner walls 14a and 15a of the mould halves 14 and 15, thereby keeping the crude core 11 in position against the injection pressure.

Subsequent heat pressing in the mould makes the spacers 25 be in one body with the compound (shell) 19. Better combination is obtained when the spacers 25 are made of material same with that used for the crude shell 19. Even when fiber orientation in the spacers 25 is microscopically different from that in the shell 19, they microscopically form unitary combination with the shell and cause no virtual lowering in strength of the resultant golf club head. A weight 20 is attached to the core 11 before the compound 19 is injected into the mould. Thus, the weight 20 can be easily embedded in the shell 19.

In the foregoing embodiments, the crude core 11 made of low melting point alloy or metal may be used. The melting core is disposed in the mould cavity, and a compound 19 is injected into the gap formed between the core and the inner wall of the mould and is heat pressed at a temperature lower than the melting point of the crude core 11. Thereafter, the crude core 11 is removed by further application of heat at a temperature above its melting point. The cavity formed by the shell 19 after the removal of the melting core 11 is filled with urethane foam or other suitable plastic foam.

Figure 12:
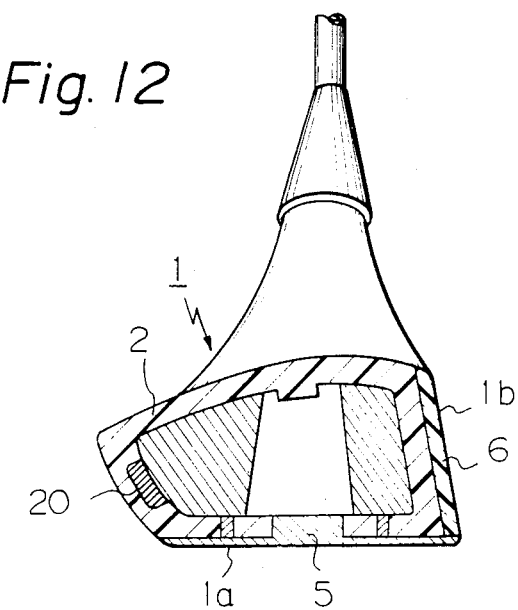
FIG. 12 is a sectional side view of one example of the golf club head produced by the method shown in FIG. 11.

In the case of the foregoing embodiments, a compound is injected into a gap surrounding a crude core placed in position in a mould cavity and the produced golf club head has a core-to-shell construction such as shown in FIGS. 4 10 and 12.

Figure 13:
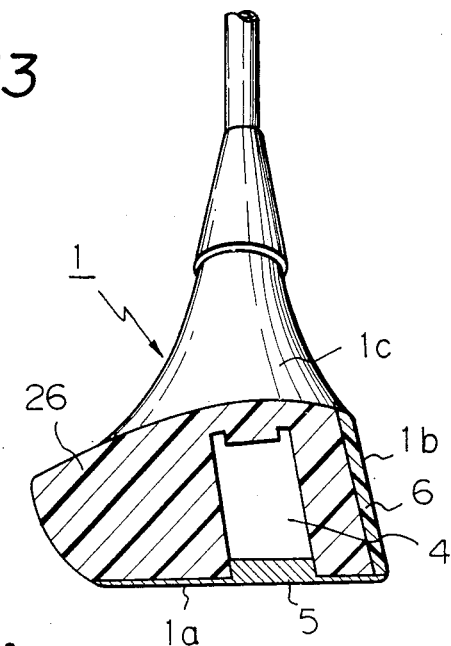
FIG. 13 is a side sectional view of the other example of the golf club head produced by the method in accordance with the present invention.

However, application of the present invention, more specifically use of an injection tube can be extended to production of a golf club head such as shown in FIG. 13, in which a golf club head 1 has a unitary, substantially solid main body 26.

Figure 14:
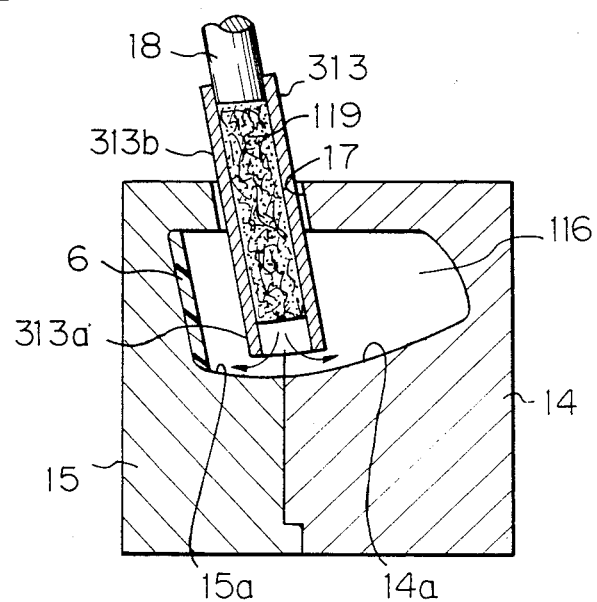
FIGS. 14 and 15 are side sectional views for showing production of the golf club head shown in FIG. 13.
Figure 15:
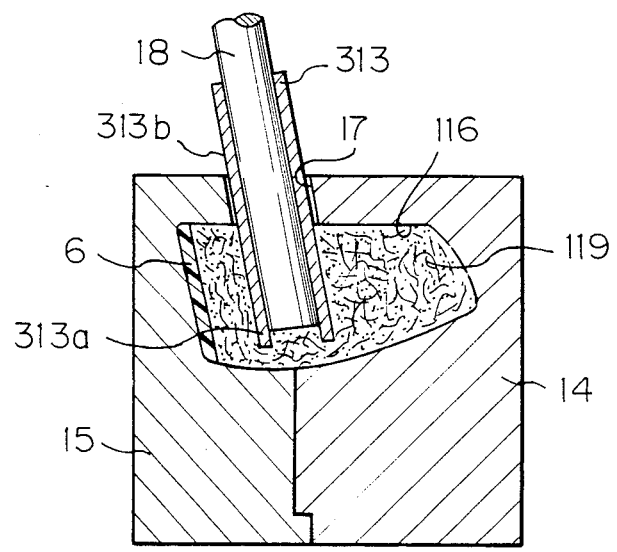

Such a golf club head is produced by the method shown in FIGS. 14 and 15. In this case, a straight injection tube 313 is clamped at its body 313b by the mould halves 14 and 15 whilst leaving an air vent 17. Preferably, the injection tube 313 is arranged with its axis in parallel with the inner wall 15a of the mould half 15 defining the face side 1b of the golf club head 1 shown in FIG. 13. Its supply mouth 313a is directed to and somewhat spaced from the inner walls 14a and 15a defining the top side 1c of the golf club head 1.

By operation of the piston rod 18, a compound 119 is injected into the mould cavity 116 as shown in FIG. 15. The injection tube 313 is removed after sufficient hardening of the compound 119 by heat pressing.

Like the foregoing embodiments, the injection tube 313 provides a sort of asylum for the extra bulk of compound 119, thereby remarkably reducing production of dregs on the product.

I claim:

1. Improved method for producing a golf club head comprising the steps of holding firm an elongated injection tube by a fastened splittable mould with its supply mouth opening deeply in a mould cavity and being spaced from the mould cavity wall, injecting a preselected weight of a compound into said mould cavity through said injection tube until said mould cavity is filled with said compound, heat pressing said compound within said mould cavity whereby said injection tube provides an asylum within the mould cavity for an excess of said predetermined weight of said compound required for filling said mould cavity, and removing said injection tube after appreciable hardening of said compound by said heat pressing while retaining said excess of said compound within said golf club head, whereby successive golf club heads are produced having substantially equal weight.

2. Improved method as claimed in claim 1 which
    said holding step includes partly inserting an elongated injection tube through a preparatorily shaped crude core with its supply mouth opening in one side surface of said crude core and its body projecting from another side surface of said crude core and placing said crude core in position in a cavity of a mould leaving a prescribed gap therearound whilst holding firm said body of said injection tube by said mould, and said injection step includes injecting the compound into said prescribed gap through said injection tube.

3. Improved method as claimed in claim 2 which
    said injection tube has a change in its outer diameter along its length and a through hole in said crude core receptive of said tube also has a corresponding change in diameter along its length.

4. Improved method as claimed in claim 3 in which said change in outer diameter is a continuous change.

5. Improved method as claimed in claim 3 in which said change in outer diameter is a discontinuous change.

6. Improved method as claimed in claim 2 in which said crude core has a tubular projection surrounding said body of said injection tube and
    the height of said tubular projection is equal to the thickness of said prescribed gap near the position of hold on said body of said injection tube by said mould.

7. Improved method as claimed in claim 1 in which said supply mouth opens in the axial direction of said injection tube.

8. Improved method as claimed in claim 6 in which said crude core is provided with at least one spacer attached to its surface opposite to said one side surface in which said supply mouth of said injection tube opens, and
    the size of said spacer along said axial direction of said injection tube is equal to the thickness of said prescribed gap near the position of hold on said body of said injection tube by said mould.

9. Improved method as claimed in claim 2 further comprising the step of
    removing said crude core after said heat pressing by further application of heat at a temperature higher than the melting point of said crude core.

10. Improved method as claimed in claim 1 wherein said supply mouth opens in a direction normal to the axial direction of said injection tube.

11. Improved method as claimed in claim 1, wherein said compound comprises a fiber reinforced plastic.

12. A method for producing a golf club head within a mould cavity provided by splittable mould halves joined together at portions thereof and having opposed inner walls defining a portion of said mould cavity, said method comprising the steps of
    securely holding an elongated hollow injection tube extending within said mould cavity, said injection tube extending through the inner wall of one of said mold halves and having an open mouth arranged proximate to the inner wall of another of said mould halves, injecting a preselected weight of a compound through the open mouth of said injection tube and into said mould cavity until said mould cavity is filled with said compound, heat pressing said compound until appreciably hardened while maintaining said mouth of said injection tube at its location proximate to the inner wall of said mould half to permit an excess of said preselected weight of said compound to be received within said injection tube through said open mouth, said injection tube providing a reservoir within said mould cavity for the excess of said preselected weight of said compound required for filling said mould cavity whereby the excess is prevented from flowing between joined portions of said mould halves during said heat pressing, and removing said injection tube from within said mould cavity after said heat pressing while retaining said excess of said compound within said golf club head, whereby successive golf club heads are produced having substantially equal weight.

13. The method as claimed in claim 12, wherein said open mouth of said injection tube opens in a radial direction with respect to a longitudinal axis of said injection tube.

14. The method as claimed in claim 12, wherein said compound comprises a fiber reinforced plastic.

* * * * *

UNITED STATES PATENT AND TRADEMARK OFFICE
CERTIFICATE OF CORRECTION

PATENT NO. : 4,650,626

DATED : March 17, 1987

INVENTOR(S) : Kurokawa

It is certified that error appears in the above-identified patent and that said Letters Patent is hereby corrected as shown below:

Column 8, line 6, change "6" to --2--.

Signed and Sealed this

Twenty-second Day of September, 1987

Attest:

DONALD J. QUIGG

Attesting Officer     Commissioner of Patents and Trademarks